United States Patent [19]

Portoulas

[11] 3,916,438

[45] Oct. 28, 1975

[54] CHROMA CHANNEL WITH AUTOMATIC COLOR CORRECTION

[75] Inventor: Panayiotis G. Portoulas, Glenview, Ill.

[73] Assignee: Warwick Electronics Inc., Chicago, Ill.

[22] Filed: Apr. 29, 1974

[21] Appl. No.: 464,743

[52] U.S. Cl. .................................................... 358/28

[51] Int. Cl.$^2$ ........................ H04N 9/12; H04N 9/50

[58] Field of Search ........................................ 358/28

[56] References Cited

UNITED STATES PATENTS

| | | | |
|---|---|---|---|
| 3,617,621 | 11/1971 | Cochran | 358/28 X |
| 3,654,384 | 4/1972 | Kresock | 358/28 |
| 3,663,744 | 5/1972 | Harwood | 358/28 |
| 3,800,073 | 3/1974 | Marik et al. | 358/28 |

OTHER PUBLICATIONS

Sears, Roebuck & Co. Owner's Manual–Television Receiver Model 564.41991300 Series Cover page, pp. 11–14 and page bearing date 4–73.

*Primary Examiner*—Robert L. Richardson
*Attorney, Agent, or Firm*—Wegner, Stellman, McCord, Wiles & Wood

[57] ABSTRACT

In a color television receiver, a chroma channel includes a fleshtone detector which generates a correction signal when the received chroma signal is within the fleshtone region of the color vector diagram. A phase shifter generates two demodulation axis signals, having fixed phases with respect to received burst, which are coupled to a chroma demodulator to develop demodulated color output signals. In response to the correction signal, a semiconductor switch couples reactive impedances in circuit with the phase shifter to open the demodulation axes in order to emphasis fleshtone hues. The fleshtone detector, in one embodiment, includes a pair of transistors respectively coupled to the chroma amplifier and the reference oscillator, and connected to form a synchronous demodulator. In another embodiment, the fleshtone detector comprises a resistor and inverter matrix for combining selected color difference signals, from the output of the chroma demodulator, to indicate when the received chroma signal is in the fleshtone region of the color vector diagram.

5 Claims, 3 Drawing Figures

CHROMA CHANNEL WITH AUTOMATIC COLOR CORRECTION

BACKGROUND OF THE INVENTION

This invention relates to a chroma channel having a fleshtone correction circuit which automatically alters the demodulation angles during reception of fleshtone hues.

Many fleshtone correction circuits are known for emphasizing the fleshtone region of the color vector diagram in order to make fleshtone reproduction less critically dependent on the exact phase of the chroma or color signals which are received by the chroma channel of a color television receiver. Generally, emphasis of the fleshtone hues tend to distort other hues, so additional circuits are provided to compensate for hue errors in the remaining quadrants of the color vector diagram. Fleshtone enhancement has been primarily accomplished by wide angle demodulation, or by adding a vector component to the chroma signal.

Manually enabled fleshtone correction circuits typically alter the phase angle between the demodulation axes in order to enhance fleshtone reproduction. In U.S. Pat. No. 3,662,097, for example, a manual switch causes a capacitive impedance to be inserted in order to vary the gain of a demodulator. In U.S. Pat. No. 3,654,384, a manual switch causes an increase in the demodulation phase angle. In a copending application of George G. LeCrenn and John H. Furrey, U.S. Ser. No. 120,962, filed Mar. 4, 1971 now U.S. Pat. No. 3,825,673, and assigned to the same assignee as the present application, a "Color Gamut Compressor" is shown in which the included angle between a pair of demodulation axes is opened in response to manual actuation of a switch.

Automatic fleshtone correction circuits, operative during a predetermined portion of the color vector diagram, are known but are unduly complex. In response to a correction signal, either the phase of the chroma signal is altered by adding a suitable signal in the chroma channel, or an artificial signal is reinserted in place of the chroma signal, which artificial signal is closer to a fleshtone hue. An example of such a system is shown in U.S. Pat. No. 3,649,748. In addition, various demodulators are known for detecting the presence of a predetermined region of the color vector diagram, such as the synchronous demodulator shown in U.S. Pat. No. 3,553,354.

SUMMARY OF THE INVENTION

In accordance with the present invention, an improved chroma channel in a color television receiver includes a fleshtone correction circuit which automatically alters the demodulation axes during reception of fleshtone colors. A fleshtone detector, also referred to as a fleshtone correction signal generator, detects the presence of the fleshtone region of the color vector diagram, and enables a semiconductor switch to insert reactive impedances into a phase shifter. This opens the pair of demodulation axes for the chroma demodulator, resulting in wide angle demodulation. Since wide angle demodulation occurs automatically and only during the presence of fleshtone hues, there is no undesirable distortion of the other hues of the color vector diagram. The resulting circuit is of simple and straightforward design.

One object of the present invention is the provision of an improved chroma channel having a fleshtone detector, and a switching circuit for automatically altering the demodulation angles in response to detection of the presence of fleshtone hues.

Other objects and features of the invention will be apparent from the following description, and from the drawings. While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated.

DESCRIPTION OF THE PREFERRED EMBODIMENTS

Figure 1:
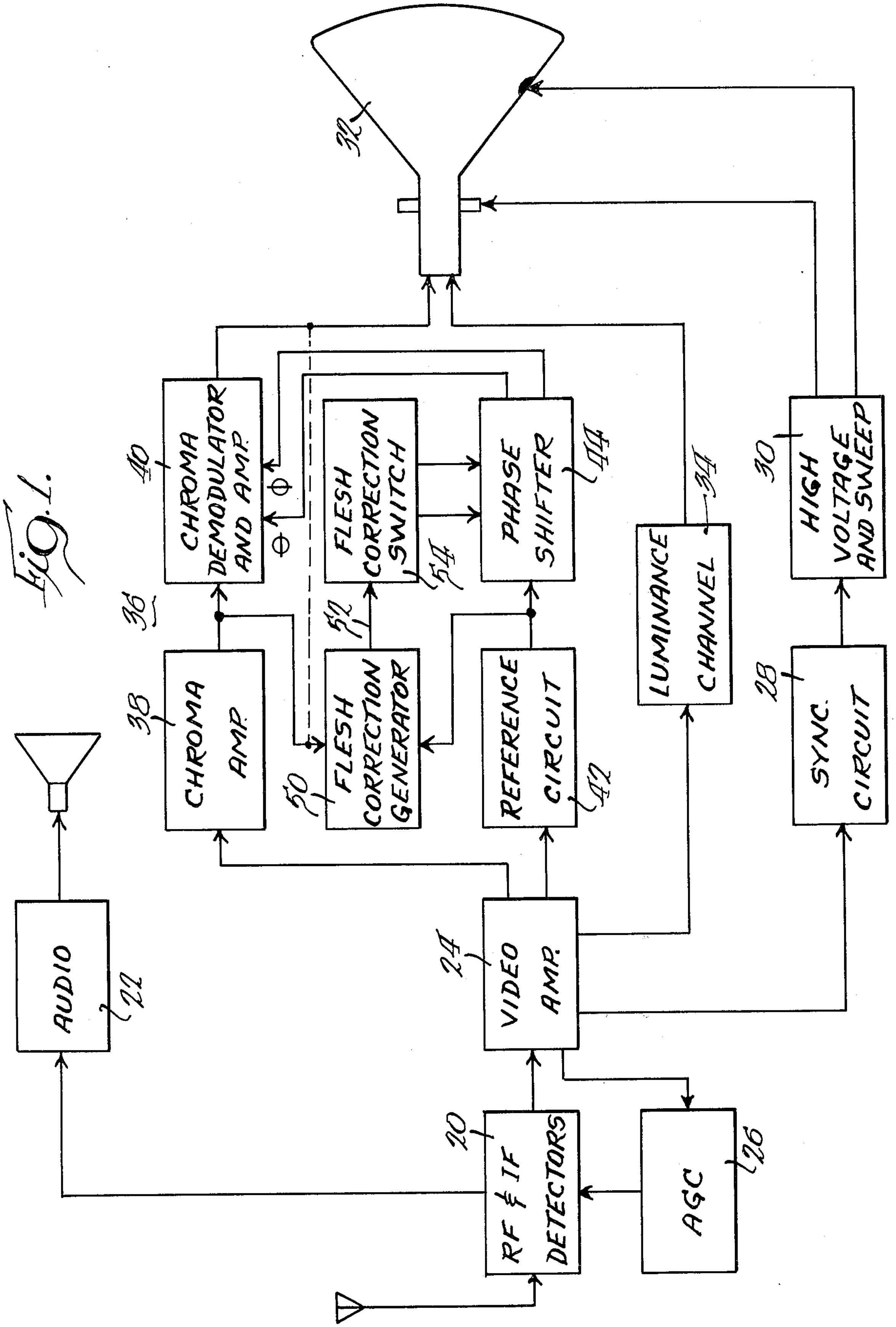
FIG. 1 is a block diagram of a color television receiver having an improved chroma channel for automatically altering the chroma demodulation axes during reception of fleshtone hues.

Turning to FIG. 1, a color television receiver includes an RF and IF detector stage 20 for detecting the received composite color television signal to provide an audio signal to an audio stage 22 and a video signal to a video amplifier 24. An AGC circuit 26 provides automatic gain control for the receiver. The synchronizing component of the composite color television signal is separated by a sync circuit 28 and controls a high voltage and sweep stage 30 which generates high voltage and horizontal and vertical sweep signals, which are coupled to a color cathode ray tube (CRT) 32. The remaining portion of the composite color television signal is separated into a luminance or Y component, processed by a luminance channel 34. and a chroma component, processed by a chroma channel 36 which consists of the remaining stages illustrated in FIG. 1.

Chroma channel 36 includes a chroma amplifier 38 and a chroma demodulator and amplifier stage 40 which develop color difference signals coupled to three color guns in the color CRT 32. The chroma burst signal is detected by a reference circuit 42 and develops a continuous 3.58 MHz sine wave which is coupled to a phase shifter 44 for developing a pair of demodulation axes signals $\theta$ and $\phi$. The phase reference signals $\theta$ and $\phi$ are coupled to the demodulation stage 40, and cause demodulation along the phase angles established by the $\theta$ and $\phi$ demodulation axis signals in order to develop the output color difference signals. It will be recognized that the above described circuits are conventional, and various modifications may be made therein, as desired.

In accordance with the present invention, both the chroma signal and the 3.58 MHz oscillation signal are coupled to a fleshtone detector or flesh correction generator 50 which generates, on a control line 52, a control signal whenever the received chroma signal is in the fleshtone region of the color vector diagram. No control signal is generated when the received chroma is in the other hue regions, outside the second quadrant of the color vector diagram.

In response to the control signal, a flesh correction switch 54 is enabled and opens the included phase angles between the two demodulation axis signals $\theta$ and $\phi$. The resulting wide angle demodulation, as is well known, reduces fleshtone errors by expanding the range of chroma angles which are reproduced as a fleshtone hue, thereby making the color television receiver less dependent on the exact phase of the received chroma signal. As the chroma signal rotates to other regions of the color vector diagram, the flesh correction switch 54 is disabled and the phase shifter 44 produces standard demodulation axis signals $\theta$ and $\phi$ for normal angle demodulation. Since the remaining hues of the color vector diagram are not distorted, no additional compensation circuitry is necessary.

Figure 2:
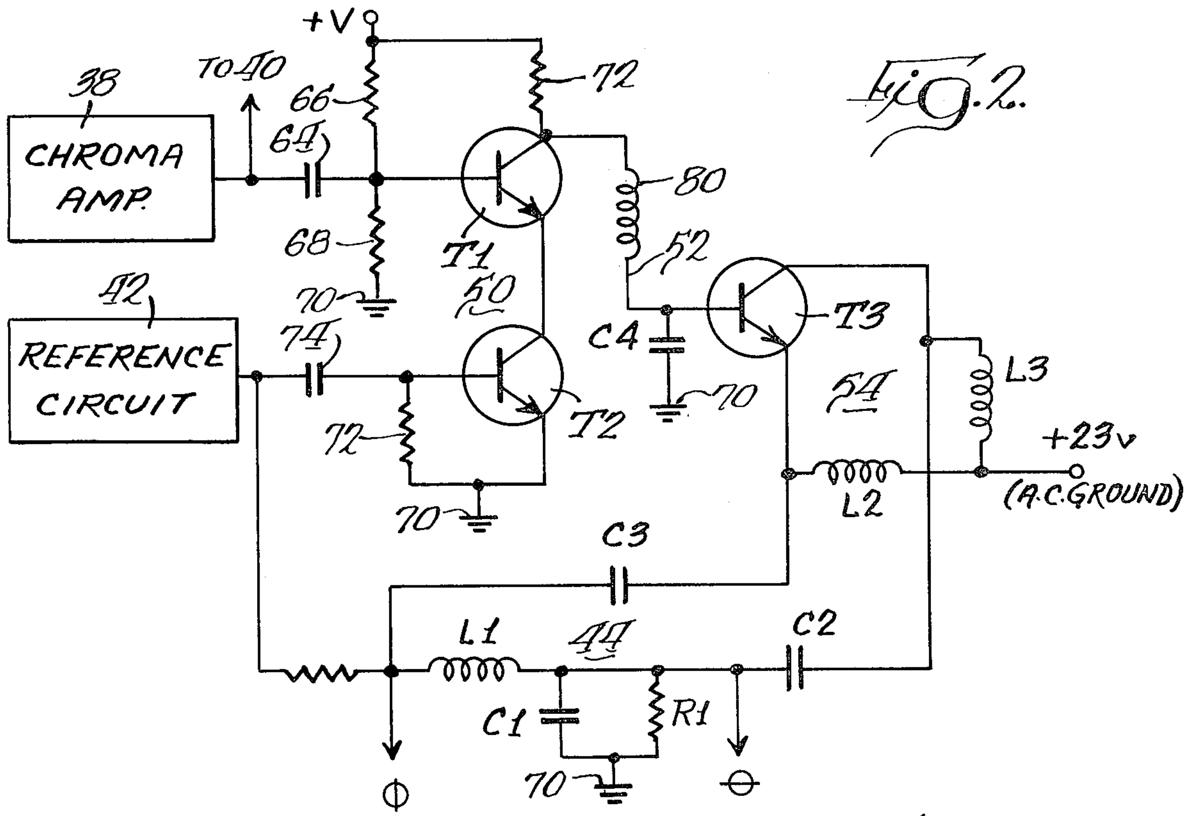
FIG. 2 is a schematic diagram of one embodiment for the flesh correction generator, the flesh correction switch, and the phase shifter shown in block form in FIG. 1.

In FIG. 2, one embodiment is illustrated in detail for the flesh correction generator 50, flesh correction switch 54, and phase shifter 44. The flesh correction generator 50 consists of a pair of transistors T1 and T2 connected as a synchronous detector. The base of transistor T1 is coupled through a capacitor 64 to the chroma amplifier 38. A pair of resistors 66 and 68, connected between a source of positive voltage, labeled +V, and a source of reference potential or ground 70, have the junction therebetween coupled to the base of transistor T1. A resistor 72 couples the collector of the transistor T1 to the +V source. The emitter of transistor T1 is directly coupled to the collector of transistor T2. The emitter of transistor T2 is coupled to ground 70, and the base thereof is coupled through a resistor 72 to ground 70. A capacitor 74 connects the base of transistor T2 to the reference circuit 42.

In operation, transistor T2 turns on and off at the 3.58 MHz reference signal rate. Transistor T1 cannot conduct unless transistor T2 is biased on. The output of transistor T1 can be positive, zero, or negative, depending on the relative phases of the inputs to the synchronous detector. When the fleshtone region is being received, transistor T1 has a positive output. This output is coupled through an inductor 80 to the line 52. A capacitor C4 bypasses to ground the line 52.

Flesh correction switch 54 consists of a transistor T3 having its collector coupled through an inductor L3 to +23 volts, which corresponds to AC ground, and through a reactive impedance in the form of a capacitor C2 to the $\theta$ output line of the phase shifter 44. The emitter of transistor T3 is coupled through an inductor L2 to the same +23 volt source, which corresponds to AC ground, and through a reactive impedance in the form of a capacitor C3 to the $\phi$ output line of the phase shifter 44.

Transistor T3 operates as two switching diodes, namely, a base-emitter diode and a base-collector diode. These diodes switch capacitors C2 and C3 to ground, by means of capacitor C4, whenever the output of transistor T1 is positive and of sufficient amplitude to forward bias the two diodes.

Phase shifter 44 consists of an inductor L1, and a paralleled capacitor C1 and resistor R1 coupled to ground 70. The LCR network shifts the angle of the 3.58 MHz reference signal so as to establish the $\theta$ reference signal. When transistor T3 is nonconducting, the high impedances of inductors L3 and L2 effectively keep capacitors C2 and C3 out of the phase shifter circuit, so that the phase angle $\theta$ is established by inductor L1, capacitor C1 and resistor R1. With transistor T3 conducting, the phase angle is enlarged by AC grounding capacitors C2 and C3. The values of capacitors C2 and C3 may be chosen so that, when grounded, the included phase angle is enlarged symmetrically in both positive and negative directions, thereby causing wide angle demodulation in the demodulator stage.

Figure 3:
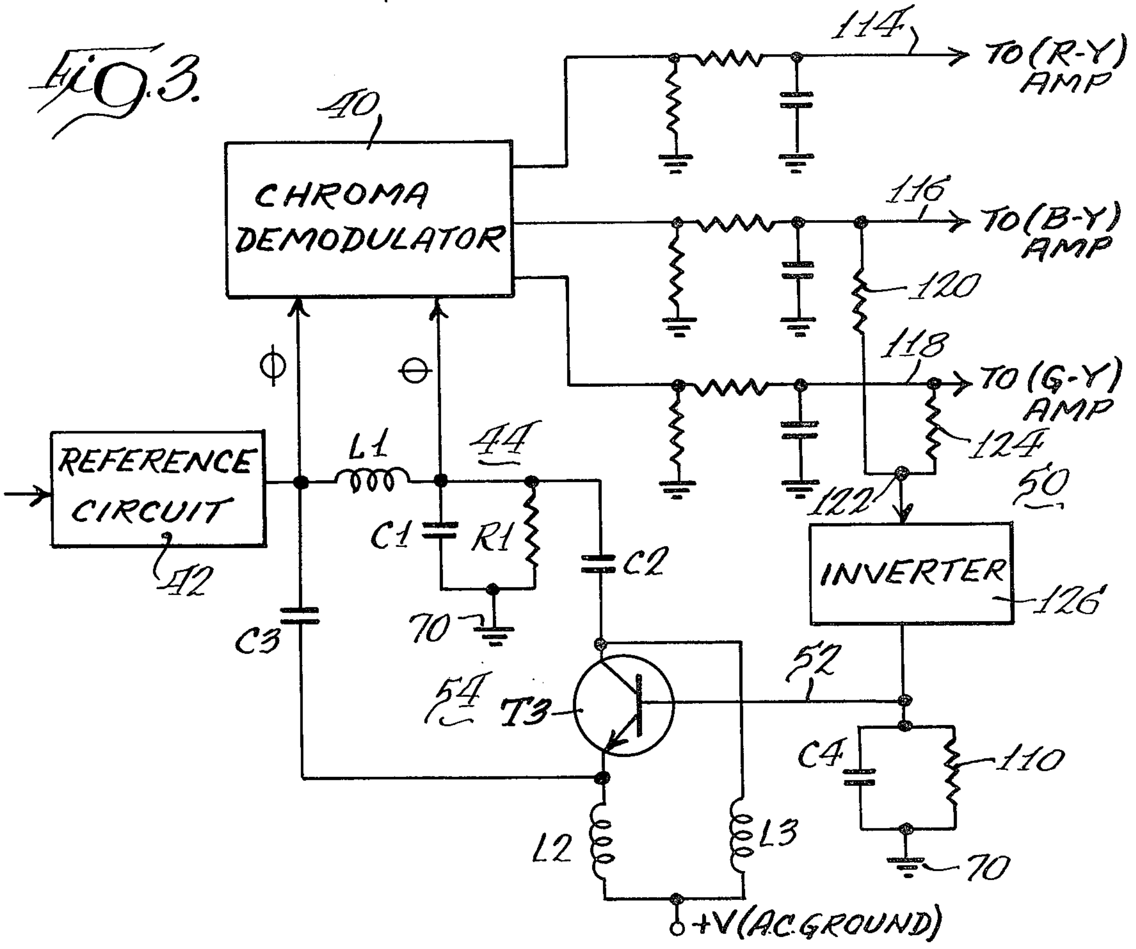
FIG. 3 is a schematic diagram of an alternate embodiment for the flesh correction generator, the flesh correction switch, and the phase shifter in block form in FIG. 1.

In FIG. 3, an alternate embodiment for the circuit of FIG. 2 is illustrated, in which the synchronous detector is replaced by a different type of flesh correction generator 50. Similar components have been identified by the same reference numerals previously used in FIGS. 1 and 2. It will be seen that the flesh correction switch 54 and the phase shifter 44 are the same, except that a resistor 110 has been connected in parallel with capacitor C4.

Flesh correction generator 50 consists in FIG. 3 of a resistor inverter matrix which uses the chroma output signals from demodulator 40 to determine when the fleshtone region is present. The chroma demodulator 40 respectively generates over lines 114, 116 and 118 the R—Y, B—Y, and G—Y color difference signals. The B—Y output line 116 is coupled through a resistor 120 to a summing junction 122. The G—Y output line 118 is coupled through a resistor 124 to the same summing junction 122. The matrixed B—Y and G—Y signals are then inverted by an inverter 126 to develop on control line 52 a positive voltage when hues in the fleshtone region are received.

Various modifications may be made to the above circuits. The switching transistor T3 can be replaced by two diodes, two transistors, or other semiconductor switching devices. It also should be noted that fleshtone correction can be achieved by using, during most of the color vector diagram, wide angle demodulation and automatically narrowing the demodulation angles during transmission of colors in the green area. With this method, the undistorted hues would occur in the green region, while the remaining hues of the color vector diagram would be distorted. Although this method is inferior to the previously described method, it will produce acceptable color reproduction since the two most critical hues to the human viewer, namely fleshtone and green, will be processed as desired. Other modifications and changes may be made following the above teachings.

I claim:

1. In a color television receiver having a source of chroma signal and a source of reference oscillation signal, an improved chroma channel, comprising:

phase shifter means coupled to the reference oscillation source for developing at least two demodulation signals corresponding to at least two demodulation axes having a predetermined angle therebetween, demodulator means coupled to the chroma signal source for developing color output signals, a synchronous detector with a pair of transistors each having base, collector and emitter electrodes, the base electrodes being respectively coupled to the chroma signal source and the reference oscillation source, the collector electrode of one of the pair of transistors being directly coupled with the emitter electrode of the other transistor, the synchronous detector producing a control signal with a predetermined magnitude when a predetermined phase relationship exists between the chroma signal and the reference oscillation signal, and switching means coupled to a remaining collector electrode of the other of the pair of transistors and responsive to said control signal for varying the predetermined angle between the demodulation signals from the phase shifter means to thereby automatically modify hues occurring within a predetermined region of the color vector diagram.

2. In a color television receiver having a source of chroma signal and a source of reference oscillation signal, an improved chroma channel, comprising:

phase shifter means coupled to the reference oscillation source for developing at least two demodulation signals corresponding to at least two demodulation axes having a predetermined angle therebetween, demodulator means coupled to the chroma signal source for developing a plurality of color output signals, a matrix including at least a pair of resistors for matrixing together at least a pair of the color output signals, and means coupled with the resistors for generating a control signal when a predetermined phase relationship exists between the chroma signal and the reference oscillation signal, and switching means responsive to said control signal for varying the predetermined angle between the demodulation signals from the phase shifter means to thereby automatically modify hues occurring within a predetermined region of the color vector diagram.

3. In a color television receiver having a source of chroma signal and a source of reference oscillation signal, an improved chroma channel, comprising:

phase shifter means coupled to the reference oscillation source for developing at least two demodulation signals corresponding to at least two demodulation axes having a predetermined angle therebetween, demodulator means coupled to the chroma signal source for developing color output signals, generator means for developing a control signal indicating the existance of a predetermined phase relationship between the chroma signal and the reference oscillation signal, and switching means including a reactive impedance coupled to the phase shifter means and a semiconductor device responsive to the control signal for inserting the reactive impedance in the phase shifter means to alter one of the demodulation signals in order to vary the predetermined angle between the demodulation signals from the phase shifter means to thereby automatically modify hues occurring within a predetermined region of the color vector diagram.

4. The improved chroma channel of claim 3 including a second reactive impedance, and the semiconductor device comprises a semiconductor switch having a pair of output electrodes and a control electrode, the control electrode being coupled to the generator means, and the pair of output electrodes being coupled to the pair of reactive impedances to effectively insert the reactive impedances in circuit with the phase shifter means to alter the angles of both demodulation signals.

5. The improved chroma channel of claim 4 wherein the semiconductor device comprises a transistor having a base electrode corresponding to the control electrode and emitter and collector electrodes corresponding to the output electrodes, a capacitor for shunting the base electrode to a reference source, and the emitter and collector electrodes are coupled through a pair of separate inductors to a voltage source which corresponds to AC ground.

* * * * *